(12) United States Patent
Van Wijk (10) Patent No.: US 12,434,540 B2
(45) Date of Patent: Oct. 7, 2025

(54) TRANSPORT POWER GENERATOR SYSTEM

(71) Applicant: Carrier Corporation, Palm Beach Gardens, FL (US)

(72) Inventor: Ruud Van Wijk, Noordwijk (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 594 days.

(21) Appl. No.: 17/941,087

(22) Filed: Sep. 9, 2022

(65) Prior Publication Data
US 2023/0078149 A1 Mar. 16, 2023

(30) Foreign Application Priority Data

Sep. 10, 2021 (EP) .................................... 21196011

(51) Int. Cl.
| | | |
|---|---|---|
| H02J 7/14 | (2006.01) | |
| B60H 1/32 | (2006.01) | |
| B60K 25/00 | (2006.01) | |
| B60P 3/20 | (2006.01) | |
| F03G 7/08 | (2006.01) | |

(Continued)

(52) U.S. Cl.
CPC .......... *B60H 1/3226* (2013.01); *B60K 25/00* (2013.01); *B60P 3/20* (2013.01); *F03G 7/081* (2021.08); *F03G 7/083* (2021.08); *H02J 7/0063* (2013.01); *H02J 7/02* (2013.01); *H02J 7/14* (2013.01)

(58) Field of Classification Search
CPC ....................................................... H02J 7/14
USPC ....................................................... 320/104
See application file for complete search history.

(56) References Cited

U.S. PATENT DOCUMENTS

| | | | |
|---|---|---|---|
| 2,058,872 A | 10/1936 | Heideman | |
| 2,084,032 A | 6/1937 | Ives | |
| 2,895,308 A | 7/1959 | Alward | |

(Continued)

FOREIGN PATENT DOCUMENTS

| | | |
|---|---|---|
| CN | 207481673 U | 6/2018 |
| CN | 207481745 U | 6/2018 |

(Continued)

OTHER PUBLICATIONS

European Search Results for Application No. 21196011.7; Issued Mar. 3, 2022; 6 Pages.

*Primary Examiner* — Edward Tso
*Assistant Examiner* — Ahmed H Omar
(74) *Attorney, Agent, or Firm* — CANTOR COLBURN LLP (57) ABSTRACT

A transport refrigeration system includes a transportation refrigeration unit; an energy storage device configured to provide electrical power to the transportation refrigeration unit; and an electric generation device 340 operably connected through a mechanical interface 370 to at least one of a wheel 364 of the transport refrigeration system and a wheel axle 365 of the transport refrigeration system; the mechanical interface includes: a first clutch mechanism 371 operable to selectively engage the electric generation device with at least one of the wheel and the wheel axle to generate electrical power to charge the energy storage device; and a second clutch mechanism 372, the second clutch mechanism is an overrunning clutch configured to disengage the electric generation device from the wheel and/or the wheel axle when a rotational velocity of the electric generation device is greater than a rotational velocity of the wheel and/or the wheel axle.

15 Claims, 3 Drawing Sheets

(51) Int. Cl.
   *H02J 7/00* (2006.01)
   *H02J 7/02* (2016.01)

(56) References Cited

U.S. PATENT DOCUMENTS

| | | |
|---|---|---|
| 4,536,668 A | 8/1985 | Boyer |
| 4,761,577 A | 8/1988 | Thomas et al. |
| 7,514,803 B2 | 4/2009 | Wilks |
| 7,547,980 B2 | 6/2009 | Harrison |
| 8,776,928 B2 | 7/2014 | Stover, Jr. et al. |
| 8,935,933 B1 | 1/2015 | Koelsch |
| 9,099,898 B2 | 8/2015 | Thompkins |
| 9,415,660 B2 | 8/2016 | Koelsch |
| 9,702,443 B2 | 7/2017 | Erlston et al. |
| 10,752,110 B2 | 8/2020 | Quill et al. |
| 10,931,165 B2 | 2/2021 | Van Wijk |
| 10,967,742 B2 | 4/2021 | Healy |
| 2018/0264951 A1 | 9/2018 | Kooi |
| 2019/0329650 A1 | 10/2019 | Quill |

FOREIGN PATENT DOCUMENTS

| | | |
|---|---|---|
| DE | 202018104062 U1 | 8/2018 |
| EP | 3427992 A1 | 1/2019 |
| FR | 2429116 A1 | 1/1980 |
| WO | 2019229490 A1 | 12/2019 |
| WO | 2020072301 A1 | 4/2020 |
| WO | 2020117467 A1 | 6/2020 |

TRANSPORT POWER GENERATOR SYSTEM

FOREIGN PRIORITY

This application claims priority to European Patent Application No. 21196011.7, filed Sep. 10, 2021, and all the benefits accruing therefrom under 35 U.S.C. § 119, the contents of which in its entirety are herein incorporated by reference.

TECHNICAL FIELD OF INVENTION

The invention relates to transport refrigeration systems and more specifically, the energy management of such transport refrigeration systems.

BACKGROUND OF THE INVENTION

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system.

Conventionally, transport refrigeration systems (such as refrigerated vehicles and refrigerated trailers) include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. The transport refrigeration unit is mounted to the vehicles or to the trailer in operative association with a cargo space defined within the vehicles or trailer for maintaining a controlled temperature environment within the cargo space. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems such as refrigerated vehicles and refrigerated trailers, the compressor, and typically other components of the transportation refrigeration unit, must be powered during transit by an electric motor. In an electrically driven transport refrigeration system, a prime mover of the transport refrigeration system (e.g. a wheel and/or a wheel axle) drives an AC synchronous or AC asynchronous generator that generates AC power. The generated AC power is used to power the electric motor for driving the refrigerant compressor of the transportation refrigeration unit and also powering electric AC fan motors for driving the condenser and evaporator motors and electric heaters associated with the evaporator.

Safer and more efficient methods of generating electrical power from a prime mover of the transport refrigeration system are envisaged.

SUMMARY OF THE INVENTION

According to a first aspect of the present invention, there is provided a transport refrigeration system comprising: a transportation refrigeration unit; an energy storage device configured to provide electrical power to the transportation refrigeration unit; and an electric generation device operably connected through a mechanical interface to at least one of a wheel of the transport refrigeration system and a wheel axle of the transport refrigeration system; wherein the mechanical interface comprises: a first clutch mechanism operable to selectively engage the electric generation device with at least one of the wheel and the wheel axle to generate electrical power to charge the energy storage device; and a second clutch mechanism, wherein the second clutch mechanism is an overrunning clutch configured to disengage the electric generation device from the wheel and/or the wheel axle when a rotational velocity of the electric generation device is greater than a rotational velocity of the wheel and/or wheel axle.

This configuration has advantages over conventional arrangements of electric generation devices as there is provided two distinct mechanisms to control when the electric generation device is engaged with the wheel and/or the wheel axle. The inventors have identified that if an electric generation device is rotatably engaged with a wheel and/or wheel axle of a transport refrigeration system such as a refrigerated vehicle during an emergency stopping manoeuvre, the electric generation device can act to drive the wheel and/or wheel axle if the wheel and/or wheel axle decelerates faster than the electric generation device.

Clutch mechanisms which are externally controlled can include a delay in the control response—for example, the additional reaction time of a human operator and/or the delay for the actuation of controllable elements. However, in an emergency stop of a transport refrigeration system, it is desirable to provide immediate/instantaneous disengagement of the electric generation device from the wheel and/or wheel axle of the transport refrigeration system to prevent these components being inadvertently driven by the electric generation device and reducing the stopping effectiveness of the transport refrigeration system.

In the present invention, the first clutch mechanism can be operated to selectively engage the electric generation device when it is desired to charge the energy storage device. For example, it may be desired to recover rotational energy from the wheel and/or the wheel axle during deceleration of the vehicle (e.g. when braking is applied), and/or during downhill travel of the vehicle, and/or during controlled stopping manoeuvres when the vehicle is brought to a complete rest. However, during an emergency stopping manoeuvre the rotational velocity of the wheel and/or the wheel axle will attempt to decelerate faster than the electric generation device as a result of the rotational inertia of the rotor of the electric generation device. Additionally, generator motoring and other undesirable effects can occur in the electric generation device. As such, during an emergency stopping manoeuvre, the electric generation device can act to drive the wheel and/or the wheel axle, reducing the effectiveness of the braking and putting mechanical stress on the mechanical interface and the electric generation device.

In order to address this issue, the second clutch mechanism provides a second mechanism of control in the form of an overrunning clutch. The overrunning clutch is configured to disengage the electric generation device from the wheel and/or the wheel axle when a rotational velocity of the electric generation device is greater than a rotational velocity of the wheel and/or axle. The overrunning clutch (or freewheel clutch) can advantageously give an immediate mechanical disengagement, with no delay for actuation of controllable elements or other types of control. Accordingly, particularly during an emergency stopping manoeuvre, if the electric generation device is engaged with the wheel and/or the wheel axle and the rotational velocity of the electric generation device becomes greater than the rotational velocity of the wheel and/or the wheel axle, then the overrunning clutch will disengage the electric generation device from the wheel and/or the wheel axle. Transmission of driving force from the electric generation device to the wheel and/or wheel axle is therefore avoided and the system is safer and less likely to break down due to undesired mechanical stresses exerted on the mechanical interface.

The mechanical interface is configured to control the transfer of rotational energy of the wheel and/or the wheel axle to the electric generation device. In other words, when the wheel and/or wheel axle is engaged with the electric generation device through the mechanical interface, rotational motion is transferred from the wheel and/or wheel axle to an input shaft of the electric generation device. When the mechanical interface has disengaged the electric generation device from the wheel and/or the wheel axle, rotational motion is not transferred to the electric generation device.

Accordingly, the mechanical interface may comprise one or more components configured to transfer rotational motion. The one or more components may change the speed, torque or direction of the rotation. The mechanical interface may comprise at least one of a belt system, one or more drive shafts, a gear box and a drive train.

One or more components of the mechanical interface may be externally controllable. For example, the mechanical interface may be controlled to select a different gear ratio to change the torque transmitted from the wheel and/or wheel axle to the electric generation device. Each controllable component of the mechanical interface may be controlled by a separate electronic, pneumatic or hydraulic control system, or a single electronic, pneumatic or hydraulic control system may control all controllable components of the mechanical interface.

The second clutch mechanism may be positioned to directly connect the mechanical interface to the electric generation device.

As such, the remaining components of the mechanical interface are automatically mechanically disconnected from the electric generation device if the rotational velocity of the mechanical interface falls below the rotational velocity of the electric generation device. Thus, if a fault develops in the mechanical interface to slow/stop its rotation, e.g. a gear jamming, the action of the second clutch mechanism will prevent the electric generation device from attempting to drive the mechanical interface and cause inadvertently damage to the components of the mechanical interface.

At least part of the mechanical interface may be integrated within the electric generation device.

The second clutch mechanism may be integrated with the electric generation device. Advantageously the configuration of the electric generation device can be made more compact.

The second clutch mechanism may be directly connected to a drive (input) shaft of the electrical generation device.

The second clutch mechanism may be positioned to directly connect the mechanical interface to at least one of the wheel and the wheel axle.

As such, during an emergency stopping manoeuvre, the wheel and/or the wheel axle is also not inadvertently driven by the rotational inertia of the mechanical interface.

The first clutch mechanism may be integrated with the electric generation device. The first clutch mechanism may be controlled by a controller of the electric generation device. Where the first clutch mechanism is electronically controlled, all of the electrical components of the energy management system can thus be located together and protected from external conditions by a housing or such like.

The overrunning clutch may automatically and/or immediately mechanically disengage the electric generation device from the wheel and/or the wheel axle when a rotational velocity of the electric generation device is greater than a rotational velocity of the wheel and/or axle.

If the response of the overrunning clutch is automatic, this allows the system to respond instantaneously, or at least at timescales that are relevant during an emergency stopping manoeuvre.

The overrunning clutch may be a solely mechanical device. The overrunning clutch may not comprise any controllable components. Thus the response of the device is mechanical and immediate, not comprising any delays from the software or hardware operation of the controllable components.

By using a simple mechanical overrunning clutch the cost of the system can be kept low while still optimising its safety. The mechanical overrunning clutch can also provide clutch mechanism control even in the event of a failure of the first clutch mechanism or a failure of a controller of the transport refrigeration system.

The overrunning clutch may be one of a sprag clutch, a roller ramp clutch, a wrap spring clutch or a wedge ramp clutch.

The electric generation device may be a hub generator operably connected through the mechanical interface to a wheel of the transport refrigeration system.

The electric generation device may be an axle generator operably connected through the mechanical interface to a wheel axle of the transport refrigeration system.

The electric generation device may be a permanent magnet AC generator, reluctance AC generator, asynchronous AC generator, or a synchronous AC generator.

The overrunning clutch may be retrofitted into an existing mechanical interface of a transport refrigeration system.

The first clutch mechanism may comprise one or more controllable components. The first clutch mechanism may be an electric clutch mechanism. The first clutch mechanism may comprise one or more actuators.

By providing a clutch mechanism that can be externally controlled (by an operator and/or a control system), the efficiency of the application of the electric generation device is improved. For example, the electric generation device can be selectively engaged by the first clutch mechanism at an optimal time to recover rotational energy from the wheel and/or wheel axle (e.g. when the transport refrigeration system is travelling downhill), and selectively disengaged at a non-optimal time (e.g. when the transport refrigeration system is accelerating).

The transport refrigeration system may comprise a power management module in electrical communication with the energy storage device, the electric generation device and the first clutch mechanism; wherein the power management module is configured to operate the first clutch mechanism based on data from one or more sensors.

The power management module may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

By controlling the first clutch mechanism based on data from one or more sensors the system can select the optimal time to harvest electrical energy from the rotational energy of the wheel and/or the wheel axle. For example, it may be desired to recover rotational energy from the wheel and/or the wheel axle during deceleration of the vehicle when braking is applied, and/or during downhill travel of the vehicle, and/or during controlled stopping manoeuvres when the vehicle is brought to a complete rest. This improved selectivity and/or control increases both the efficiency and safety of the system.

However, during an emergency stopping manoeuvre, the response time of an electronic control module may not be fast enough in order to avoid inadvertently driving the wheel and/or wheel axle via the rotational inertia of the rotor of the electric generation device. Thus, the action of the first and a second clutch mechanism, one providing selective control during normal operation of the electric generation system and the other providing a mechanical failsafe during emergency stopping, combine synergistically to improve overall safety and efficiency of the system.

The transport refrigeration system may further comprise a rotational velocity sensor configured to detect a rotational velocity of the wheel and/or wheel axle and in electrical communication with the power management module; wherein the first clutch mechanism is operable to engage the electric generation device with the wheel and/or the wheel axle to generate electrical power responsive to a deceleration of the wheel and/or wheel axle being greater than a predetermined deceleration.

The transport refrigeration system may further comprise a pitch sensor configured to detect a pitch angle of the transport refrigeration system and in electrical communication with the power management module; wherein the first clutch mechanism is operable to engage the electric generation device with the wheel and/or the wheel axle to generate electrical power responsive to the pitch angle being less than a predetermined pitch angle.

The transport refrigeration system may further comprise a rotational velocity sensor configured to detect a rotational velocity of the electric generation device and in electrical communication with the power management module; wherein, when the electric generation device is operably engaged with the wheel and/or the wheel axle, the power management module is configured to decrease a torque limit of the electric generation device responsive to a deceleration of the electric generation device being greater than a predetermined deceleration.

The torque limit may be decreased for a selected period of time.

The torque limit may be decreased until the rotational velocity of the electric generation device increases to a predetermined rotational velocity.

According to a second aspect of the invention there is provided a method of operating a transport refrigeration system, the method comprising: powering a transportation refrigeration unit using an energy storage device; charging the energy storage device using an electric generation device operably connected through a mechanical interface to at least one of a wheel of the transport refrigeration system and a wheel axle of the transport refrigeration system, wherein the mechanical interface comprises a first clutch mechanism and a second clutch mechanism, and wherein charging the energy storage device using the electric generation device comprises: operating the first clutch mechanism to engage the electric generation device with the wheel and/or the wheel axle to generate electrical power; and when a rotational velocity of the electric generation device is greater than a rotational velocity of the wheel and/or the wheel axle, disengaging the electric generation device from the wheel and/or the wheel axle by the second clutch mechanism, wherein the second clutch mechanism is an overrunning clutch.

The method may further comprise operating the first clutch mechanism to disengage the electric generation device from the wheel and/or the wheel axle.

The method may further comprise operating the first clutch mechanism using a power management module; wherein the power management module is in electrical communication with the energy storage device, the electric generation device and the first clutch mechanism; and wherein the power management module operates the first clutch mechanism based on data from one or more sensors.

The method may further comprise: detecting a rotational velocity of the wheel and/or wheel axle using a rotational velocity sensor; and operating the first clutch mechanism, using the power management module, to engage the electric generation device with the wheel and/or the wheel axle to generate electrical power responsive to a deceleration of the wheel and/or wheel axle being greater than a predetermined deceleration.

The method may further comprise: detecting a pitch angle of the transport refrigeration system using a pitch sensor; and operating the first clutch mechanism, using the power management module, to engage the electric generation device with the wheel and/or the wheel axle to generate electrical power responsive to the pitch angle being less than a predetermined pitch angle.

The method may further comprise: detecting a rotational velocity of the electric generation device using a rotational velocity sensor; and when the electric generation device is operably engaged with the wheel and/or the wheel axle, decreasing, using the power management module, a torque limit of the electric generation device.

The method may further comprise increasing the torque limit after a selected period of time.

The method may further comprise increasing the torque limit when the rotational velocity increases to a selected rotational velocity.

BRIEF DESCRIPTION OF THE DRAWINGS

A preferred embodiment of the present invention will now be described in greater detail, by way of example only and with reference to the drawings, in which.

DETAILED DESCRIPTION OF THE INVENTION

Figure 1:
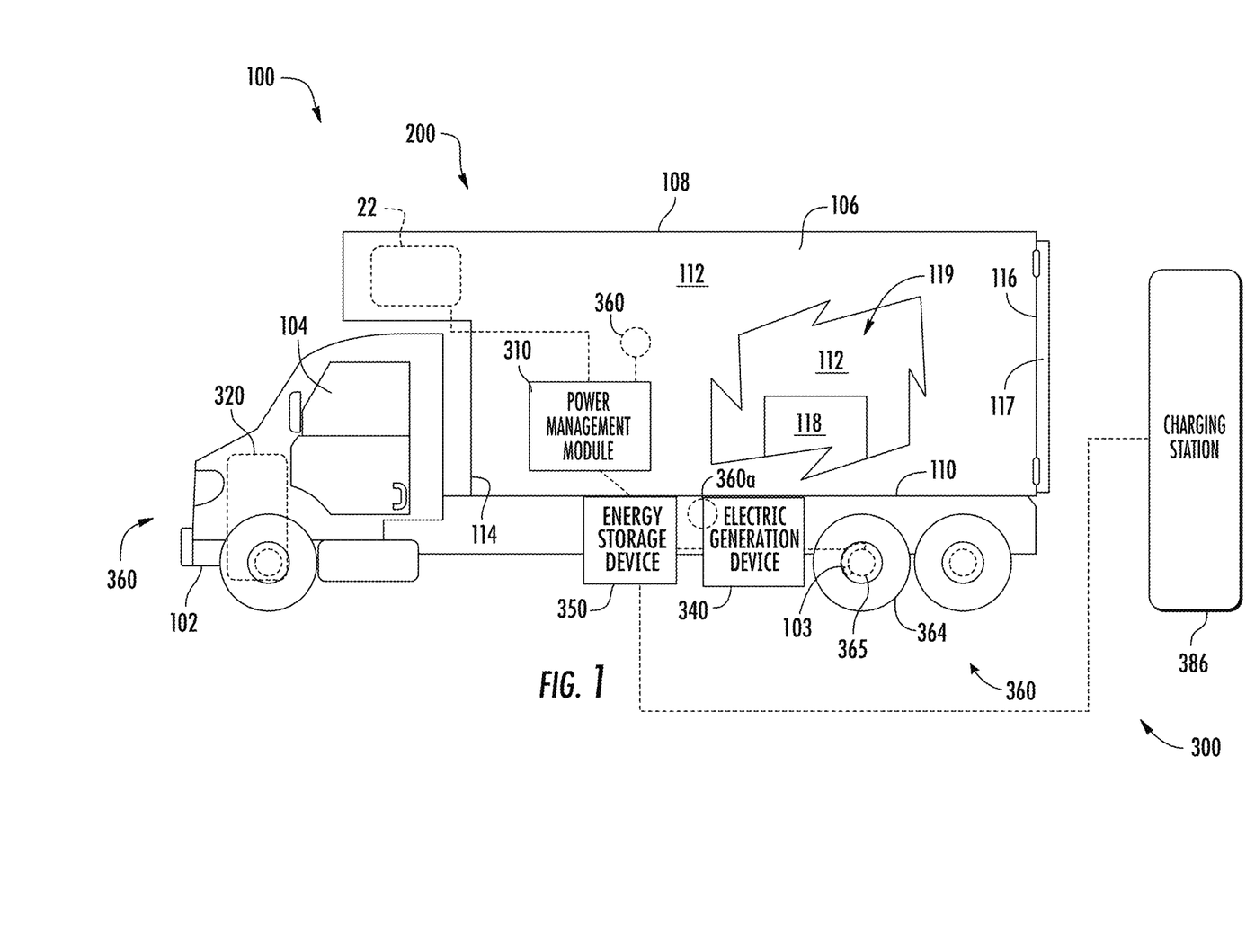
FIG. 1 shows a transport refrigeration system.
Figure 2:
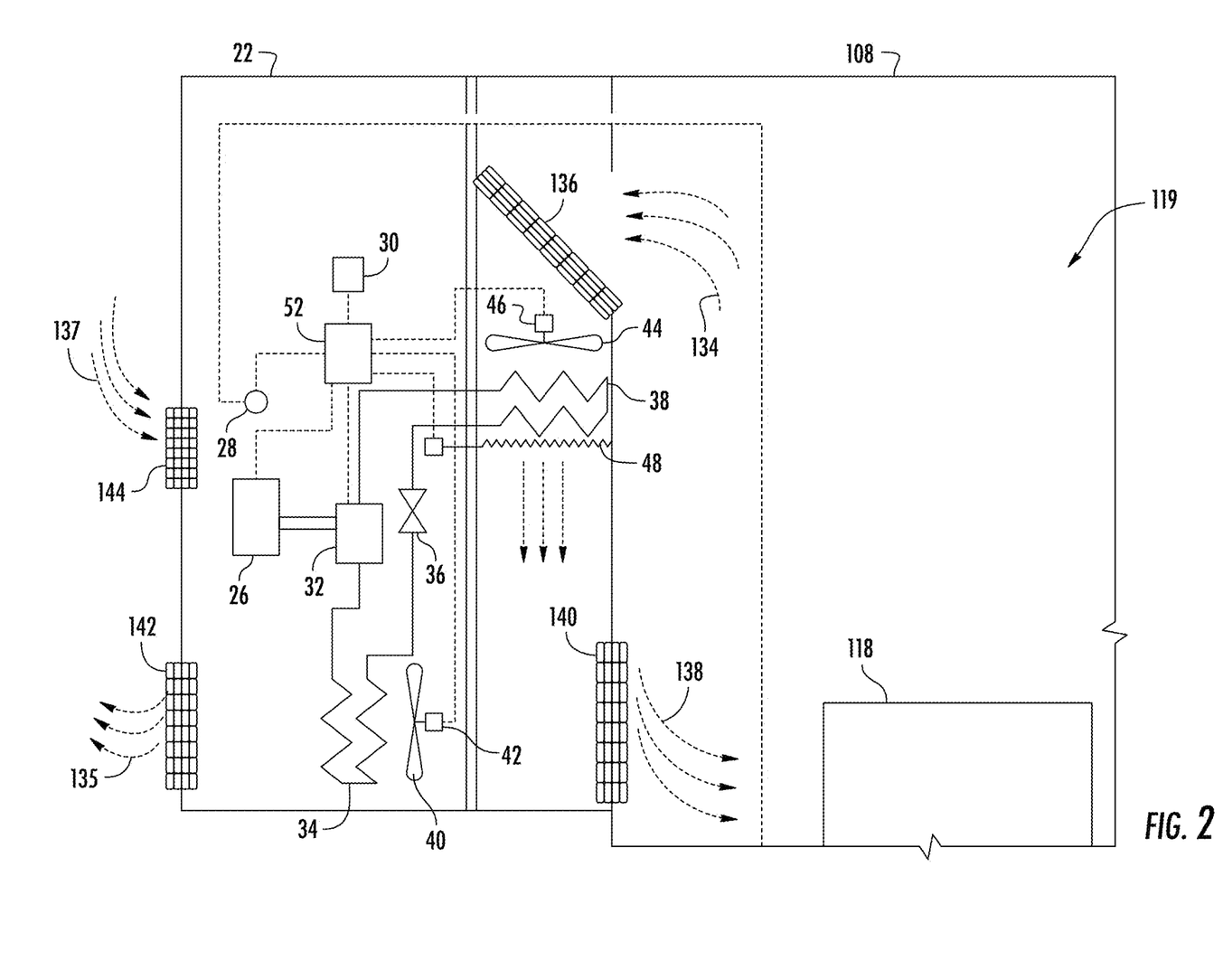
FIG. 2 shows a transportation refrigeration unit of the transport refrigeration system of FIG. 1.
Figure 3:
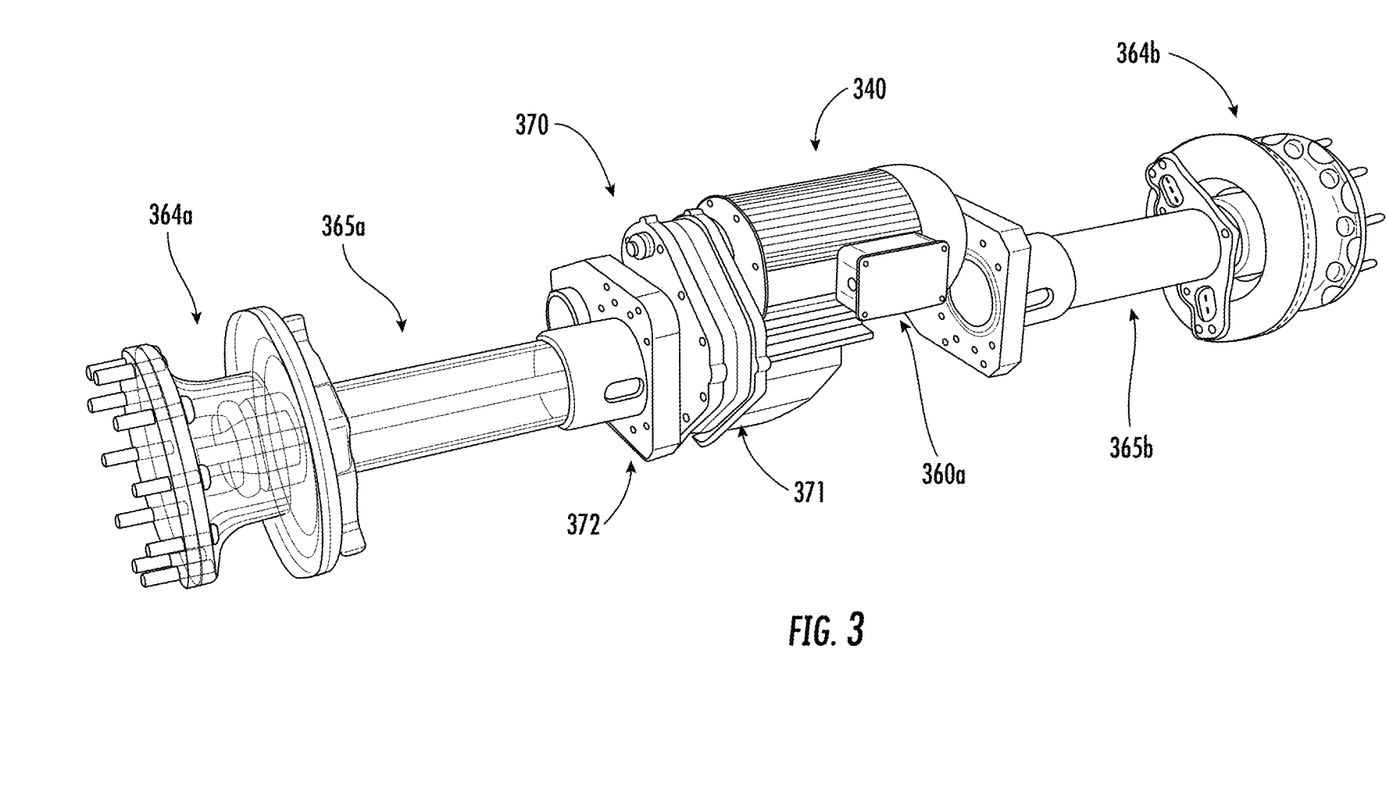
FIG. 3 shows an electric generation device.

FIG. 1 shows a transport refrigeration system 200. FIG. 2 shows an enlarged schematic illustration of a transport refrigeration unit 22 suitable for use in the transport refrigeration system 200. FIG. 3 shows an enlarged schematic illustration of an electric generation device 340 suitable for use in the transport refrigeration system 200.

The transport refrigeration system 200 is illustrated as a trailer system 100, as seen in FIG. 1. The trailer system 100 includes a vehicle 102 including an operator's compartment or cab 104 and a propulsion motor 320 which acts as the drive system of the trailer system 100. The propulsion motor 320 is configured to power the vehicle 102. The energy source that powers the propulsion motor 320 may be at least one of compressed natural gas, liquefied natural gas, gasoline, electricity, diesel, or a combination thereof. The propulsion motor 320 may be an electric motor or a hybrid motor (e.g., a combustion engine and an electric motor).

The trailer system 100 includes a transport container 106 coupled to the vehicle 102. The transport container 106 may be integrated with the vehicle 102 (e.g. a non-trailer refrigeration such as, for example a rigid truck, a truck having refrigerated compartment) or removably coupled to the vehicle 102 (e.g. a tractor-trailer refrigerated system). In FIG. 1, the transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, a refrigerant compression device 32, an electric motor 26 for driving the refrigerant compression device 32, and a controller 30. The transportation refrigeration unit 22 is in operative association with the refrigerated cargo space 112 and is configured to provide conditioned air to the transport container 106. The transportation refrigeration unit 22 functions, under the control of the controller 30, to establish and regulate one or more desired environmental parameters, such as, for example temperature, pressure, humidity, carbon dioxide, ethylene, ozone, light exposure, vibration exposure, and other conditions in the interior compartment 119, as known to one of ordinary skill in the art. In an embodiment, the transportation refrigeration unit 22 is capable of providing a desired temperature and humidity range.

The transportation refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The transportation refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transportation refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transportation refrigeration unit 22 is operating in a subcritical refrigerant cycle or as a refrigerant gas cooler, such as if the transportation refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerate cargo space 119 of the transport container 106 by means of the transportation refrigeration unit 22. A return airflow 134 flows into the transportation refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transportation refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transportation refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transportation refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the electric motor 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The transportation refrigeration unit 22 is powered by the energy storage device 350, which provides electrical power to the transportation refrigeration unit 22 and will be discussed further below. Examples of the energy storage device 350 may include a battery system (e.g., a battery or bank of batteries), fuel cells, flow battery, and others devices capable of storing and outputting electric energy that may be DC. The energy storage device 350 may include a battery system, which may employ multiple batteries organized into battery banks.

The energy storage device 350 may be charged by a stationary charging station 386 such as, for example a wall 48V power outlet. The charging station 386 may provide single phase (e.g., level 2 charging capability) or three phase AC power to the energy storage device 350. It is understood that the charging station 386 may have any phase charging and embodiments disclosed herein are not limited to single phase or three phase AC power. In an embodiment, the single phase AC power may be a high voltage DC power, such as, for example, 500 VDC.

The energy storage device 350 may be located outside of the transportation refrigeration unit 22, as shown in FIG. 1, or the energy storage device 350 may be located within the transportation refrigeration unit 22. The transportation refrigeration unit 22 has a plurality of electrical power demand loads on the energy storage device 350, including, but not limited to, the drive motor 42 for the fan 40 associated with the refrigerant heat rejection heat exchanger 34, and the drive motor 46 for the fan 44 associated with the refrigerant heat absorption heat exchanger 38. As each of the fan motors 42, 46 and the electric motor 26 may be an AC motor or a DC motor, it is to be understood that various power converters 52, such as AC to DC rectifiers, DC to AC inverters, AC to AC voltage/frequency converters, and DC to DC voltage converters, may be employed in connection with the energy storage device 150 as appropriate. In the depicted embodiment, the heater 48 also constitutes an electrical power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136. Additionally, the electric motor 26 being used to power the refrigerant compression device 32 also constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage from the energy storage device 350.

As described above the energy storage device 350 is used to electrically power the transportation refrigeration unit 22. The energy storage device 350 is integrated within an energy management system 300. The energy management system 300 comprises an electric generation device 340, the energy storage device 350 configured to provide electrical power to electric motor 26, the electric motor 26 configured to power the transportation refrigeration unit 22, a power management module 310, and one or more sensors 360.

The electric generation device 340, as shown in FIG. 3, is configured to harvest electrical power from kinetic energy of the trailer system 100. The electric generation device 340 as shown comprises an axle generator (the electric generation device 340 is mounted on or operably connected to a wheel axle 365a of the trailer system 100) configured to recover rotational energy when the transport refrigeration system 200 is in motion and convert that rotational energy to electrical energy, such as, for example, when the axle 365 of the trailer system 100 is rotating during acceleration, cruising, or braking. However, the electric generation device 340 may alternatively or additionally comprise a hub generator (mounted on or operably connected to a wheel 364 of the trailer system 100). The electric generation device 340 supplies the generated electrical power to the energy storage device 350.

It is understood that the electric generation device 340 may be mounted on any wheel 364 or axle 365 of the trailer system 100 and the mounting location of the electric generation device 340 illustrated in FIG. 1 is one example of a mounting location.

The electric generation device 340 is operably connected to the wheel axle 365a through a mechanical interface 370. The mechanical interface 370 operably engages the wheel axle 365a with the electric generation device 340 to enable the transmission of rotational movement from the wheel axle 365a to a drive/input shaft of the electric generation device 340. For example, the mechanical interface 370 may comprise a gear box and/or a drive train.

The mechanical interface 370 comprises a first (e.g. primary) clutch mechanism 371. The first clutch mechanism 371 is operable to selectively engage the electric generation device 340 with the wheel axle 365a (and/or wheel 364a). In other words, the first clutch mechanism 371 controls when rotational movement is transmitted to the electric generation device 340 and when the electric generation device 340 is able to generate electrical power to charge the energy storage device 350.

The mechanical interface 370 also comprises a second (e.g. secondary) clutch mechanism 372. The second clutch mechanism 372 is an overrunning clutch (sometimes referred to as a freewheel). The overrunning clutch 372 is configured to disengage the electric generation device 340 from the wheel axle 365a (and/or wheel 364a) when a rotational velocity of the input shaft of the electric generation device 340 is greater than a rotational velocity of the wheel axle 365a (and/or wheel 364a).

During normal operation of the electric generation device 340, the first clutch mechanism 371 is controlled to engage the electric generation device 340 with the wheel axle 365*a* (and/or wheel 364*a*) when it is desired to extract rotational kinetic energy from the wheel axle 365*a*. The first clutch mechanism 371 may be manually controlled by an operator of the transport refrigeration system 200, e.g. a driver. However, preferably, the first clutch mechanism 371 is controlled by the power management module 310.

The power management module 310 is in electrical communication with the energy storage device 350, the electric generation device 340, the first clutch mechanism 371, and one or more sensors 360. The power management module 310 controls the first clutch mechanism 371 to engage the electric generation device 340 with the wheel axle 365*a* (and/or wheel 364*a*) based on data received from at least one of the energy storage device 350, the electric generation device 340 and the one or more sensors 360.

The power management module 310 uses the data received from at least one of the energy storage device 350, the electric generation device 340 and the one or more sensors 360 to determine when it is a good time to extract rotational kinetic energy from the wheel axle 365*a* (and/or wheel 364*a*).

For example, the one or more sensors 360 comprise a rotational velocity sensor configured to detect a rotational velocity of the wheel 364*a* and/or the wheel axle 365*a*. The rotational velocity sensor is configured to identify a deceleration of the vehicle 102. The rotational velocity sensor is in operative association with the vehicle 102 and may detect when a brake 103 of the vehicle 102 is being applied to slow the vehicle 102 and/or the vehicle 102 is decelerating without the brakes 103 being applied (i.e., driver lets foot off accelerator pedal). The power management module 310 is configured to control the first clutch mechanism 371 to engage the electric generation device 340 when the deceleration is greater than a selected deceleration, which may indicate that some propulsion motor 320 rotation is no longer needed to drive the vehicle 102, and it is a good time to bleed off some rotational energy of the wheels 364 and/or axles 365 of the trailer system 100 using the electric generation device 340. Bleeding off rotational energy of the wheels 364 or axles 365 when the vehicle 102 is decelerating helps reduce any performance impact to the ability of the propulsion motor 320 to power the vehicle 102.

The one or more sensors 360 may comprise an inertial pitch sensor configured to detect a pitch angle of the vehicle 102. The power management module 310 is configured to control the first clutch mechanism 371 to engage the electric generation device 340 when the when the pitch angle is less than a selected pitch angle, which may indicate that some propulsion motor 320 rotation is no longer needed to drive the vehicle 102 and it is a good time to bleed off some rotational energy of the wheels 364 and/or axles 365 of the trailer system 100 using the electric generation device 340. For example, when the vehicle 102 is descending downhill with a negative pitch angle, gravity assists in driving the vehicle 102 downhill and the full capacity of the rotational energy of the wheels 364 and/or axles 365 may no longer be needed to drive the vehicle 102. Bleeding off rotational energy of the wheels 364 and/or axles 365 when the vehicle 102 is descending downhill helps reduce any performance impact to the ability of the propulsion motor 320 to power the vehicle 102.

The power management module 310 may detect a state of charge of the energy storage device 350 and determine whether the energy storage device 350 may take additional charge (i.e. electrical power). For example, the power management module 310 may detect that the state of charge of the energy storage device 350 is less than a selected state of charge (e.g., 50% charged). If the power management module 310 detects that the state of charge of the energy storage device 350 is less than a selected state of charge then the power management module 310 may increase the torque limit of the electric generation device 340 for a selected period of time if the transport refrigeration system 200 is also detected to be decelerating and/or going downhill (i.e. free energy). The selected period of time may be short enough, such that the electric generation device 340 does not overheat. Advantageously, temporarily raising the torque limit of the electric generation device 340 for a selected period of time allows the electric generation device 340 to generate as much electric power as possibly when the energy is "free" and there is space in the energy storage device 350. As discussed above, energy may be considered "free" when the vehicle 102 is moving downhill or decelerating.

The one or more sensors may comprise a rotational velocity sensor configured to detect a rotational velocity of (the rotor of) the electric generation device 340. The power management module 310 is configured to monitor the rotational velocity of the electric generation device 340 to detect wheel 364 slippage using the rotational velocity sensor. The rotational velocity sensor of the electric generation device 340 may be a sensor mechanically connected to the electric generation device 340 to detect rotational velocity of the electric generation device 340, or may be an electronic sensor electrically connected to the electric generation device 340 to detect rotational velocity of the electric generation device 340 by measuring the electrical frequency output of the electric generation device 340. In another embodiment, the rotational velocity sensor may be an inverter connected to the electric generation device 340 to detect rotational velocity of the electric generation device 340 by measuring the electrical frequency output of the electric generation device 340. In yet another embodiment, the rotational velocity sensor may be a wireless sensor capable of detecting rotational velocity of the electric generation device 340 wirelessly, such as, for example, RFID tracking, wireless capacitive sensor, wireless electromagnetic induction sensor, or any other wireless detection method known to one of skill in the art.

The power management module 310 is configured to detect and monitor the accelerations and decelerations of the electric generation device 340 in order to detect wheel 364 slippage. Sudden or rapid deceleration of the electric generation device 340 may indicate that the wheel 364*a* of the trailer system 100 has lost grip with the road surface below and the wheel 364*a* (e.g., tire) has started slipping. The power management module 310 is configured to decrease the torque limit of the electric generation device 340 when the rotational velocity of the electric generation device 340 decelerates greater than a selected deceleration. If the electric generation device 340 decelerates too fast, this may be indicative of wheel 364*a* slippage, thus the torque limit of the electric generation devices 340 may be temporarily lowered until the wheel 364*a* is able to regain traction with the road surface. Decreasing the torque limit of the electric generation device 340 will cap the rotational velocity of the wheel 364*a*, thus allowing the wheel 364*a* to slow down and regain traction.

While the above control is suitable for normal operation of the transport refrigeration system 200 (e.g. controlled deceleration of the vehicle 102 and/or downhill travel of the vehicle 102), a situation may arise where the vehicle 102 of the transport refrigeration system 200 must carry out an emergency stop. During an emergency stopping manoeuvre of the vehicle 102 the wheels 364 and wheel axles 365 must be brought to a complete rest as soon as possible. However, if the electric generation device 340 is engaged with a wheel axle 365a and/or a wheel 364a by the first clutch mechanism 371 when an emergency stopping manoeuvre is initiated, the electric generation device 340 can inadvertently drive the wheel axle 365a and/or the wheel 364a (as a result of at least one of the rotational inertia of the electric generation device 340, generator motoring of the electric generation device 340, and/or other undesirable effects) even while the brake 103 of the vehicle 102 is being applied. This can result in reduced effectiveness of the braking in an emergency stopping situation (which is unsafe) and can also put unnecessary stress on the mechanical interface 370 and the brake 103.

Thus, when the rotational velocity of the electric generation device 340 is greater than a rotational velocity of the wheel axle 365a and/or wheel 364a, as may be the case during an emergency stopping manoeuvre, the second clutch mechanism 372 automatically disengages the electric generation device 340 from the wheel axle 365a (and/or wheel 364a).

The second clutch mechanism 372, as an overrunning clutch, is able to instantaneously and automatically disconnect the electric generation device 340 from the wheel axle 365a. The overrunning clutch 372 is a simple mechanical device that does comprise any externally controllable components. For example, the overrunning clutch 372 may be a sprag clutch, a roller ramp clutch, a wrap spring clutch or a wedge ramp clutch.

The overrunning clutch 372 may be positioned to automatically disengage the mechanical interface 370 from the wheel axle 365a and/or wheel 364a, or may be positioned to automatically disengage the mechanical interface 370 from the electric generation device 340.

After an emergency stopping manoeuvre, when the rotational velocity of the wheel axle 365a and/or wheel 364a increases and is greater than the rotational velocity of the electric generation device 340 again, the overrunning clutch 372 will reengage the electric generation device 340 with the wheel axle 365a and/or wheel 364a.

What is claimed is:

1. A transport refrigeration system comprising:
   a transportation refrigeration unit;
   an energy storage device configured to provide electrical power to the transportation refrigeration unit; and
   an electric generation device operably connected through a mechanical interface to at least one of a wheel of the transport refrigeration system and a wheel axle of the transport refrigeration system;
   wherein the mechanical interface comprises:
   a first clutch mechanism operable to selectively engage the electric generation device with at least one of the wheel and the wheel axle to generate electrical power to charge the energy storage device; and
   a second clutch mechanism, wherein the second clutch mechanism is an overrunning clutch configured to disengage the electric generation device from the wheel and/or the wheel axle when a rotational velocity of the electric generation device is greater than a rotational velocity of the wheel and/or the wheel axle.

2. The transport refrigeration system of claim 1, wherein the second clutch mechanism is positioned to directly connect the mechanical interface to the electric generation device.

3. The transport refrigeration system of claim 1, wherein the second clutch mechanism is positioned to directly connect the mechanical interface to at least one of the wheel and the wheel axle.

4. The transport refrigeration system of claim 1, comprising:
   a power management module in electrical communication with the energy storage device, the electric generation device, the first clutch mechanism and one or more sensors;
   wherein the power management module is configured to operate the first clutch mechanism based on data from at least one of the energy storage device, the electric generation device and the one or more sensors.

5. The transport refrigeration system of claim 4, comprising:
   a rotational velocity sensor configured to detect a rotational velocity of the wheel and/or wheel axle and in electrical communication with the power management module;
   wherein the first clutch mechanism is operable to engage the electric generation device with the wheel and/or the wheel axle to generate electrical power responsive to a deceleration of the wheel and/or wheel axle being greater than a predetermined deceleration.

6. The transport refrigeration system of claim 4, comprising:
   a pitch sensor configured to detect a pitch angle of the transport refrigeration system and in electrical communication with the power management module;
   wherein the first clutch mechanism is operable to engage the electric generation device with the wheel and/or the wheel axle to generate electrical power responsive to the pitch angle being less than a predetermined pitch angle.

7. The transport refrigeration system of claim 4, comprising:
   a rotational velocity sensor configured to detect a rotational velocity of the electric generation device and in electrical communication with the power management module;
   wherein, when the electric generation device is operably engaged with the wheel and/or the wheel axle, the power management module is configured to decrease a torque limit of the electric generation device responsive to a deceleration of the electric generation device being greater than a predetermined deceleration.

8. The transport refrigeration system of claim 7, wherein the torque limit is decreased for a selected period of time, or wherein the torque limit is decreased until the rotational velocity of the electric generation device increases to a predetermined rotational velocity.

9. A method of operating a transport refrigeration system, the method comprising:
   powering a transportation refrigeration unit using an energy storage device;
   charging the energy storage device using an electric generation device operably connected through a mechanical interface to at least one of a wheel of the transport refrigeration system and a wheel axle of the transport refrigeration system, wherein the mechanical interface comprises a first clutch mechanism and a second clutch mechanism, and wherein charging the energy storage device using the electric generation device comprises:

operating the first clutch mechanism to engage the electric generation device with the wheel and/or the wheel axle to generate electrical power; and when a rotational velocity of the electric generation device is greater than a rotational velocity of the wheel and/or the wheel axle, disengaging the electric generation device from the wheel and/or the wheel axle by the second clutch mechanism, wherein the second clutch mechanism is an overrunning clutch.

10. The method of claim 9, comprising:
operating the first clutch mechanism to disengage the electric generation device from the wheel and/or the wheel axle.

11. The method of claim 9, comprising:
operating the first clutch mechanism using a power management module;
wherein the power management module is in electrical communication with the energy storage device, the electric generation device and the first clutch mechanism; and
wherein the power management module operates the first clutch mechanism based on data from one or more sensors.

12. The method of claim 11, comprising:
detecting a rotational velocity of the wheel and/or wheel axle using a rotational velocity sensor; and
operating the first clutch mechanism, using the power management module, to engage the electric generation device with the wheel and/or the wheel axle to generate electrical power responsive to a deceleration of the wheel and/or wheel axle being greater than a predetermined deceleration.

13. The method of claim 11, comprising:
detecting a pitch angle of the transport refrigeration system using a pitch sensor; and
operating the first clutch mechanism, using the power management module, to engage the electric generation device with the wheel and/or the wheel axle to generate electrical power responsive to the pitch angle being less than a predetermined pitch angle.

14. The method of claim 11, comprising:
detecting a rotational velocity of the electric generation device using a rotational velocity sensor; and
when the electric generation device is operably engaged with the wheel and/or the wheel axle, decreasing, using the power management module, a torque limit of the electric generation device.

15. The method of claim 14, comprising:
increasing the torque limit after a selected period of time; or
increasing the torque limit when the rotational velocity increases to a selected rotational velocity.

* * * * *